US011167352B2

(12) United States Patent
Bokkes (10) Patent No.: US 11,167,352 B2
(45) Date of Patent: Nov. 9, 2021

(54) METHOD FOR DETERMINING AN AMOUNT OF BUILD MATERIAL, WHICH IS TO BE APPLIED IN A BUILD PLANE (71) Applicant: CONCEPT LASER GMBH, Lichtenfels (DE)

(72) Inventor: Tobias Bokkes, Untersiemau (DE)

(73) Assignee: CONCEPT LASER GMBH, Lichtenfels (DE)

( * ) Notice: Subject to any disclaimer, the term of this patent is extended or adjusted under 35 U.S.C. 154(b) by 303 days.

(21) Appl. No.: 16/184,822

(22) Filed: Nov. 8, 2018

(65) Prior Publication Data
US 2019/0232370 A1 Aug. 1, 2019

(30) Foreign Application Priority Data

Jan. 31, 2018 (EP) .................................... 18154525

(51) Int. Cl.
*B22F 10/20* (2021.01)
*B33Y 30/00* (2015.01)
(Continued)

(52) U.S. Cl.
CPC ............ *B22F 10/20* (2021.01); *B23K 26/342* (2015.10); *B29C 64/153* (2017.08);
(Continued)

(58) Field of Classification Search
CPC .... B29C 64/205; B29C 64/153; B22F 3/1055
See application file for complete search history.

(56) References Cited

U.S. PATENT DOCUMENTS 10,022,794 B1* 7/2018 Redding ................ B33Y 30/00
2010/0121476 A1* 5/2010 Kritchman ............. B33Y 10/00
700/119
(Continued)

FOREIGN PATENT DOCUMENTS

CN 106825563 A 6/2017
DE 102015223719 A1 6/2017
WO WO2017/009249 A2 1/2017

OTHER PUBLICATIONS

European Search Report Corresponding to Application No. 18154525 dated Jul. 31, 2018.
(Continued)

*Primary Examiner* — Galen H Hauth
(74) *Attorney, Agent, or Firm* — Dority & Manning, P.A.

(57) ABSTRACT

Method for determining an amount of build material (3) which is to be applied in a build plane (BP) of an apparatus (1) for additively manufacturing at least one three-dimensional object (2) by means of successive layerwise selective irradiation and consolidation of layers of build material (3) applied in the build plane (BP) of the apparatus (1) by means of at least one energy beam (4), the method comprising the steps of: subdividing at least a part of the build plane (BP), particularly the complete build plane (BP), of the apparatus (1), in which build plane (BP) build material (3), which is to be selectively irradiated and consolidated during an additive manufacturing process of at least one three-dimensional object (2) by means of the apparatus (1), is to be applied, into a plurality of build plane elements (BPE), categorizing the build plane elements (BPE) in a first category.

20 Claims, 3 Drawing Sheets

(51) Int. Cl.
    *B33Y 40/00*     (2020.01)
    *B23K 26/342*    (2014.01)
    *B33Y 50/02*     (2015.01)
    *B29C 64/393*    (2017.01)
    *B33Y 50/00*     (2015.01)
    *B29C 64/205*    (2017.01)
    *B29C 64/153*    (2017.01)
    *B22F 10/30*     (2021.01)

(52) U.S. Cl.
    CPC .......... *B29C 64/205* (2017.08); *B29C 64/393* (2017.08); *B33Y 30/00* (2014.12); *B33Y 40/00* (2014.12); *B33Y 50/00* (2014.12); *B33Y 50/02* (2014.12); *B22F 10/30* (2021.01)

(56) References Cited

U.S. PATENT DOCUMENTS

| | | | |
|---|---|---|---|
| 2011/0278773 A1* | 11/2011 | Bokodi | B29C 64/153 264/497 |
| 2013/0066812 A1 | 3/2013 | Nehme et al. | |
| 2018/0222112 A1 | 8/2018 | Danzig et al. | |
| 2020/0247059 A1 | 8/2020 | Frohnmaier et al. | |

OTHER PUBLICATIONS

Machine Translated Japanese Office Action Corresponding to Application No. 2018136589 dated Sep. 30, 2019.
Examiner Iniiials.

* cited by examiner

FIG 1

METHOD FOR DETERMINING AN AMOUNT OF BUILD MATERIAL, WHICH IS TO BE APPLIED IN A BUILD PLANE

CROSS-REFERENCE TO RELATED APPLICATIONS

This application claims priority to European Patent Application serial no. 18 154 525.2 filed Jan. 31, 2018, the contents of which is incorporated herein by reference in its entirety as if set forth verbatim.

The invention relates to a method for determining an amount of build material which is to be applied in a build plane of an apparatus for additively manufacturing at least one three-dimensional object by means of successive layer-wise selective irradiation and consolidation of layers of build material applied in the build plane of the apparatus by means of at least one energy beam.

Respective principles for determining an amount of build material which is to be applied in a build plane of an apparatus for additively manufacturing at least one three-dimensional object by means of successive layerwise selective irradiation and consolidation of layers of build material applied in the build plane of the apparatus by means of at least one energy beam are generally known from the field of additive manufacturing.

An important aspect of developing such principles is the exact determination of a specific amount of build material which is to be applied in the build plane of a respective apparatus in order to generate respective layers of build material which are to be selectively irradiated and consolidated during an additive manufacturing process. In other words, respective principles shall be developed under the premise of allowing for an effective consumption of build material in an additive manufacturing process.

By now, the determination of an amount of build material which is to be applied in the build plane in order to generate a layer of build material which is to be selectively irradiated and consolidated is typically, based on static build material dosing factors—respective factors are typically determined on empiric values—which do not allow for adjusting the amount of build material which is to be applied in the build plane.

It is thus, the object of the invention to provide an improved method for determining an amount of build material which is to be applied in a build plane of an apparatus for additively manufacturing at least one three-dimensional object by means of successive layerwise selective irradiation and consolidation of layers of build material applied in the build plane of the apparatus by means of at least one energy beam.

This object is achieved by a method according to claim 1. The claims depending on claim 1 relate to possible embodiments of the method according to claim 1.

The method described herein is a method for determining an amount of build material which is to be applied in a build plane of an apparatus for additively manufacturing at least one three-dimensional object ("additive manufacturing apparatus") by means of successive layerwise selective irradiation and consolidation of layers of build material applied in the build plane of the apparatus by means of at least one energy beam. The method thus, serves for determining an amount of build material which is to be applied in a build plane of a respective additive manufacturing apparatus so as to generate respective layers of build material which are to be selectively irradiated and consolidated during an additive manufacturing process. As will be apparent from below, the method may be implemented in context with a (superordinate) method for applying an amount of build material in a build plane of a respective additive manufacturing apparatus and in a (further superordinate) method for additively manufacturing three-dimensional objects, respectively.

The method for determining an amount of build material which is to be applied in a build plane of a respective additive manufacturing apparatus comprises the following basic steps:

According to a first step, at least a part of the build plane, particularly the complete build plane, of the additive manufacturing apparatus, in which build plane build material, which is to be selectively irradiated and consolidated during an additive manufacturing process of at least one three-dimensional object by means of the apparatus, is to be applied, is subdivided into a plurality of build plane elements. In other words, at least a part of the build plane, particularly the complete build plane, of the additive manufacturing apparatus on which the method is implemented, is subdivided into a plurality of sub-areas. Thereby, each build plane element represents a specific sub-area of the build plane and each sub-area of the build plane is represented by a respective build plane element, respectively.

The build plane elements may be arranged in a regular pattern, particularly in a (two-dimensional) matrix of columns and lines, for instance. The number of columns may be equal to the number of lines. The number of build plane elements in a respective column may be equal to the number of build plane elements in a respective line. Further, the build plane elements may have the same geometry and/or size. According to an exemplary embodiment, the build plane may thus, be subdivided into a plurality of rectangular, particularly square, build plane elements of the same size with the build plane elements being disposed in a regular matrix of columns and lines (chessboard- or grid-like pattern). Yet, other geometries and/or sizes are conceivable.

The subdividing step is performed for at least one layer of build material ("layer") which is to be selectively irradiated and consolidated during additively manufacturing at least one three-dimensional object by means of the additive manufacturing apparatus on which the method is implemented. Typically, the subdividing step is successively performed for a plurality of layers, particularly for all layers, which are to be selectively irradiated and consolidated during additively manufacturing at least one three-dimensional object by means of the additive manufacturing apparatus.

The subdividing step may be executed by a hard- and/or software embodied subdividing unit which is configured to subdivide at least a part of the build plane, particularly the complete build plane, of the additive manufacturing apparatus, in which build plane build material, which is to be selectively irradiated and consolidated during an additive manufacturing process of at least one three-dimensional object by means of the additive manufacturing apparatus, is to be applied, into a plurality of build plane elements. The subdividing unit may comprise at least one subdividing algorithm or rule, respectively. A respective subdividing algorithm or rule, respectively may particularly comprise pre-definable or pre-defined subdividing parameters, such as the subdividing area, i.e. the area of the build plane which is to be subdivided into respective build plane elements, the subdividing pattern, i.e. the (two-dimensional) pattern in which the build plane is subdivided, the geometry of the build plane elements, the size of the build plane elements, etc. The subdividing step may be performed on basis of user-inputs allowing a user to pre-define subdividing parameters and/or adjust pre-defined subdividing parameters. User-inputs may be given by an appropriate mobile or immobile user-interface, e.g. a touch-panel or the like.

According to a second step, the build plane elements are categorized or classified, respectively in a first category and/or in at least one second or further category. The first category indicates that a respective build plane element is located in an area of the build plane, which is to be selectively irradiated and consolidated during the selective irradiation and consolidation of the respective layer. The respective layer is generated by applying a respective amount of build material in the build plane. The at least one second category indicates that a respective build plane element is not located in an area of the build plane, which is to be selectively irradiated and consolidated during the selective irradiation and consolidation of the respective layer. Hence, it is determined for each build plane element, if it is located in an area of the build plane, which is to be selectively irradiated and consolidated during the selective irradiation and consolidation of the respective layer, or, if it is not located in an area of the build plane, which is to be selectively irradiated and consolidated during the selective irradiation and consolidation of the respective layer. If it is determined that a build plane element is located in an area of the build plane, which is to be selectively irradiated and consolidated during the selective irradiation and consolidation of the respective layer, then the respective build plane element is categorized as a build plane element of the first category. If it is determined that a build plane element is not located in an area of the build plane, which is to be selectively irradiated and consolidated during the selective irradiation and consolidation of the respective layer, then the respective build plane element is categorized as a build plane element of the at least one second or further category.

The categorizing step may be performed on basis of build data, e.g. slice data, related to the at least one three-dimensional object which is to be additively manufactured. Respective build data typically, comprises information on the number of layers for additively manufacturing the at least one three-dimensional object which is to be additively manufactured. Respective build data typically, also comprises information on the locations, which are to be selectively irradiated and consolidated in each layer for additively manufacturing the at least one three-dimensional object which is to be additively manufactured. Respective build data may also comprise information on the locations, which are not to be selectively irradiated and consolidated in each layer for additively manufacturing the at least one three-dimensional object which is to be additively manufactured.

The categorizing step may be performed by a hard- and/or software embodied categorizing unit which is configured to categorize the build plane elements in a first category, which indicates that a respective build plane element is located in an area of the build plane, which is to be selectively irradiated and consolidated during the selective irradiation and consolidation of the respective layer, or in at least one second or further category, which indicates that a respective build plane element is not located in an area of the build plane, which is to be selectively irradiated and consolidated during the selective irradiation and consolidation of the respective layer.

According to a third step, the amount of build material which is to be applied in a respective layer is determined on basis of the number of build plane elements which have been categorized in the first category and/or the number of build plane elements which have been categorized in the at least one second category. Hence, the determination of the amount of build material which is to be applied in the build plane so as to generate a respective layer which is to be selectively irradiated and consolidated is performed on basis of a respective categorization of build plane elements in the at least two categories. Thereby, build plane elements of the first category are located in locations of the build plane, which are to be selectively irradiated and consolidated in each layer for additively manufacturing the at least one three-dimensional object which is to be additively manufactured, and build plane elements of the at least one second category are located in locations of the build plane, which are not to be selectively irradiated and consolidated in each layer for additively manufacturing the at least one three-dimensional object which is to be additively manufactured. As a general rule, build plane elements of the first category typically, require more build material than build plane elements of the second category. In other words, the amount of build material which is to be applied in the build plane is individually determined for each layer which is to be selectively irradiated and consolidated during additively manufacturing the at least one three-dimensional object. Thereby, the locations or regions of the respective layer which are to be selectively irradiated and consolidated and the locations or regions of the respective layer which are not to be selectively irradiated and consolidated are considered for determining the amount of build material which is to be applied in the respective layer. Hence, by categorizing respective build plane elements in the aforementioned first and second category, and determining the amount of build material which is to be applied in the respective layer on basis of the categorization of the build plane elements in the respective first or second category, an individual determination of an amount of build material which is to be applied in the respective layer is possible for each layer. The individual determination of the amount of build material which is to be applied in the respective layer takes into account the area of the respective layer, which is to be selectively irradiated and consolidated, and the area of the respective layer, which is not to be selectively irradiated and consolidated.

The determination step may be performed by a hard- and/or software embodied determining unit which is configured to determine the amount of build material which is to be applied in the respective layer on basis of the number of build plane elements which have been categorized in the first category and/or the number of build plane elements which have been categorized in the at least one second or further category.

As a result, an improved method for determining an amount of build material which is to be applied in a build plane of an apparatus for additively manufacturing at least one three-dimensional object by means of successive layer-wise selective irradiation and consolidation of layers of build material applied in the build plane of the apparatus by means of at least one energy beam, is provided. The method particularly, allows for individually determining the required amount of build material which is to be applied in the build plane for each layer.

The subdividing unit, the categorizing unit, and the determining unit may be separate hard- and/or software embodied units or combined in one hard- and/or software embodied control unit. Respective units or a respective control unit may form part of a build material dosing device which is assignable or assigned to an additive manufacturing apparatus.

All steps of the method may be performed (fully) automatically.

The method may further comprise subdividing the build plane elements of the second category at least in a first sub-category and/or in a second sub-category. Hence, build plane elements of the second category, i.e. the build plane elements, which are not located in an area of the build plane, which is to be selectively irradiated and consolidated during the selective irradiation and consolidation of the respective layer, may be further sub-categorized on basis of their spatial arrangement or relationship relative to the build plane elements of the first category, i.e. the build plane elements, which are located in an area of the build plane, which is to be selectively irradiated and consolidated during the selective irradiation and consolidation of the respective layer.

As will be apparent from below, there may also be at least one further sub-category of the second category, e.g. a third sub-category.

The first sub-category indicates that a respective build plane element is located directly adjacent to at least one build plane element of the first category and/or that a respective build plane element is located inside a specific threshold area of a given number of build plane elements directly adjacent to at least one build plane element of the first category. Build plane elements of the first sub-category thus, represent build plane elements which are (i) not to be selectively irradiated and consolidated, and are located (ii) directly adjacent to at least one build plane element of the first category and/or (iii) inside a specific threshold area of a given number of build plane elements directly adjacent to at least one build plane element of the first category. In other words, build plane elements of the first sub-category are (directly) adjacently located to build plane elements of the first category. The given number of build plane elements directly adjacent to at least one build plane element of the first category may be pre-definable or pre-defined; hence, the number of build plane elements directly adjacent to at least one build plane element of the first category may be defined on basis of user-inputs allowing a user to pre-define the number of build plane elements directly adjacent to at least one build plane element of the first category and/or adjust a pre-defined number of build plane elements directly adjacent to at least one build plane element of the first category. Respective build plane elements of the first sub-category are typically, located in an area behind respective build plane elements of the first category for a given direction of applying build material in the respective layer. In either case, the first sub-category serves for generating a safety zone (directly) surrounding at least part of the build plane elements of the first category which are to be selectively irradiated and consolidated in the respective layer. The safety zone shall ensure that in any case a sufficient amount of build material is applied in the respective layer.

The second sub-category indicates that, for a given direction of applying build material in the respective layer, a respective build plane element is disposed in an area behind and outside a specific threshold area of a given number of build plane elements directly adjacent to at least one build plane element of the first category. Build plane elements of the second sub-category thus, represent build plane elements which are (i) not to be selectively irradiated and consolidated, and are located (ii) (directly) adjacent to at least one build plane element of the first sub-category and thus, (iii) outside a respective specific threshold area of a given number of build plane elements of the first sub-category. In other words, build plane elements of the second sub-category are (directly) adjacently disposed to build plane elements of the first sub-category.

As mentioned above, there may also be at least one further sub-category of the second category. As such, there may also be a third sub-category. The third sub-category indicates that, for a given direction of applying build material in the respective layer, a respective build plane element is located in an area in front of at least one build plane element of the first category.

As is apparent from the above, the direction of applying build material in the respective layer, e.g. a coating direction, i.e. the direction in which a re-coating device, in particular a re-coating blade, is moved across the build plane so as to generate a layer which is to be selectively irradiated and consolidated, may also be considered for categorizing build plane elements and thus, for determining the amount of build material which is to be applied in the respective layer. The direction of applying build material in the respective layer particularly, serves for distinguishing between build plane elements of the first and second sub-category, i.e. build plane elements which are located in an area behind at least one build plane element of the first category, from build plane elements of the third sub-category, i.e. build plane elements which are located in an area in front of at least one build plane element of the first category, for a given direction of applying build material in the respective layer.

According to the method, a specific amount of build material may be assigned to each category. Likewise, a specific amount of build material may be assigned to each sub-category. Hence, the determined total amount of build material which is to be applied in a respective layer, may be determined on basis of the specific amounts of build material which are assigned to each category and sub-category in the respective layer. The determined total amount of build material which is to be applied in a respective layer will typically, be high(er) when a plurality of build plane elements of a category is given to which a high(er) amount of build material is assigned than when a plurality of build plane elements of a category is given to which a low(er) amount of build material is assigned.

The amount of build material which is assigned to the build plane elements which have been categorized in the first category is typically, larger than the amount of build material which is assigned to the build plane elements which have been categorized in the second category or respective sub-categories of the second category. As such, a first amount of build material is assigned to the build plane elements which have been categorized in the first category, at least one second amount of build material which is lower than the first amount of build material is assigned to the build plane elements which have been categorized in the second category or respective sub-categories of the second category. In other words, the amount of build material assigned to build plane elements which have been categorized in the first category, is typically larger than the amount of build material assigned to build plane elements which have been categorized in the second category or respective sub-categories of the second category. When regarding the sub-categories of the second category, the amount of build material assigned to build plane elements which have been categorized in the first sub-category, is typically larger than the amount of build material assigned to build plane elements which have been categorized in the second (or third) sub-category. It is particularly, possible that the amount of build material assigned to build plane elements which have been categorized in the second sub-category is zero. The same may apply to build plane elements of the third sub-category.

The amount of build material assigned to each category may be related with a specific dose factor of a build material dosing device, which is configured to dose a specific amount of build material which is to be applied in the build plane so as to generate a respective layer of build material which is to be selectively irradiated and consolidated. The dose factor may directly or indirectly indicate the amount of build material which is to be dosed by the build material dosing device. Thus, each category may be related with a specific dose factor of a build material dosing device. Hence, the amount of build material which is to be dosed for being applied in a respective layer will be high(er) when a plurality of build plane elements of a category to which a high(er) dose factor is assigned is given than when a plurality of build plane elements of a category to which a low(er) dose factor is assigned is given. It is possible that a dose factor of a specific category, e.g. a dose factor of the second sub-category or third sub-category, may have a value of zero or even a negative value.

As is apparent from above, a specific dose factor may be assigned to each category or sub-category, respectively. Thereby, the dose factor which is assigned to the build plane elements which have been categorized in the first category is typically larger than the dose factor which is assigned to the build plane elements which have been categorized in the second category or respective sub-categories of the second category. As such, a first dose factor is assigned to the build plane elements which have been categorized in the first category, at least one second dose factor which is lower than the first dose factor is assigned to the build plane elements which have been categorized in the second category or respective sub-categories of the second category. In other words, the dose factor assigned to build plane elements which have been categorized in the first category, is typically larger than the dose factor assigned to build plane elements which have been categorized in the second category. When regarding the sub-categories of the second category, the dose factor assigned to build plane elements which have been categorized in the first sub-category, is typically larger than the dose factor assigned to build plane elements which have been categorized in the second (or third) sub-category.

The amount of build material which is to be applied in the build plane for generating a layer of build material which is to be selectively irradiated and consolidated may finally, be determined on basis of summing up all build plane elements being categorized in the first category and being located in a specific area of the build plane, particularly in a (straight) line extending across the build plane, particularly in direction of applying build material in the respective layer, and summing up all build plane elements being categorized in the second category and being located in the specific area of the build plane, particularly in the line extending across the build plane, particularly in direction of applying build material in the respective layer. Hence, the respective dose factors assigned to the respective categories or sub-categories may be summed up so as to build a resulting dose factor.

Thereby, the amount of build material which is to be applied in the build plane of the apparatus for generating the respective layer of build material which is to be selectively irradiated and consolidated may be determined as the one of the area of the build plane, particularly in a respective (straight) line extending across the build plane, particularly in direction of applying build material in the respective layer, having the highest amount of build material assigned thereto. Likewise, the resulting dose factor which is to be applied for generating the respective layer of build material which is to be selectively irradiated and consolidated may be determined as the one of the area of the build plane, particularly in a respective (straight) line extending across the build plane, particularly in direction of applying build material in the respective layer, having the highest sum of dose factors. The resulting dose factor may thus, be or correspond at least to the dose factor of the respective area of the build plane having the highest sum of dose factors.

In the exemplary case in which the build plane is divided in a (two-dimensional) matrix of columns and lines, i.e. in which the build plane elements are arranged in a regular pattern of a two-dimensional matrix of columns and lines, the dose factors may be determined for each column or line, respectively. The dose factors of the respective build plane elements in the respective column or line are summed-up; in other words, the dose factors of the build plane elements of the respective column or line and being categorized in the first category, and the dose factors of the build plane elements of the respective column or line and being categorized in the second category or respective sub-categories of the second category, are summed-up. As an example, summing-up respective dose factors for a specific column or line may be performed as follows:

Sum of dose factors(for a respective column or line)=dose factor of build plane elements of first category×number of build plane elements of first category in the respective column or line+dose factor of build plane elements of first sub-category of second category×number of build plane elements of first sub-category of second category in the respective column or line+dose factor of build plane elements of second sub-category of second category×number of build plane elements of second sub-category of second category in the respective column or line+dose factor of build plane elements of third sub-category of second category×number of build plane elements of third sub-category of second category in the respective column or line.

The above summing-up of dose factors may be performed for each column or line, respectively so that the number of determined sums may correspond to the number columns or lines, respectively.

The resulting dose factor may be determined as the one of the respective column or line having the highest sum of dose of factors. The amount of build material which is to be applied in the build plane of the apparatus for generating the respective layer of build material which is to be selectively irradiated and consolidated may thus, be determined as the one of the column or line having the highest sum of dose factors.

The determined amount of build material which is finally, to be applied in the build plane of the apparatus for generating the respective layer of build material which is to be selectively irradiated and consolidated may be added to a pre-definable or pre-defined reference amount of build material which is to be applied in the build plane of the apparatus for generating the respective layer of build material which is to be selectively irradiated. Thus, by adding up the determined amount of build material to a respective reference amount of build material, it may be ensured that in any case a sufficient amount of build material is applied in the respective layer. The reference amount of build material is typically, also assigned to a pre-definable or pre-defined reference dose factor. Accordingly, the resulting dose factor which is to be applied for generating the respective layer of build material which is finally, to be applied in the build plane may be added to a pre-definable or pre-defined reference dose factor so as to achieve a final dose factor.

As mentioned above, the method may be implemented in context with a (superordinate) method for applying an amount of build material in a build plane of a respective apparatus and in a (further superordinate) method for additively manufacturing three-dimensional objects, respectively.

Hence, the invention also relates to a method for applying an amount of build material in a build plane of an apparatus for additively manufacturing at least one three-dimensional object by means of successive layerwise selective irradiation and consolidation of layers of build material applied in the build plane of the apparatus by means of at least one energy beam. The method comprises the steps of: determining an amount of build material, e.g. a ceramic, metal, or polymer build material, which is to be applied in the build plane of the apparatus for generating a respective layer of build material which is to be selectively irradiated and consolidated, and applying the determined amount of build material in the build plane of the apparatus for generating the respective layer of build material which is to be selectively irradiated and consolidated. Thereby, determining the respective amount an amount of build material which is to be applied in the build plane of the apparatus for generating a respective layer of build material which is to be selectively irradiated and consolidated is performed on basis of a method for determining an amount of build material which is to be applied in a build plane as specified herein. Hence, all annotations concerning the method for determining an amount of build material which is to be applied in a build plane also apply to the method for applying an amount of build material in a build plane of an apparatus for additively manufacturing at least one three-dimensional object.

Further, the invention relates to a method for additively manufacturing at least one three-dimensional object by means of successive layerwise selective irradiation and consolidation of layers of build material, e.g. a ceramic, metal, or polymer build material, applied in the build plane of the apparatus by means of at least one energy beam, e.g. an electron or laser beam. Thereby, layers of build material which are to be selectively irradiated and consolidated are applied on basis of the aforementioned method for applying an amount of build material in a build plane of an apparatus for additively manufacturing at least one three-dimensional object. The method may be a selective laser sintering method, a selective laser melting method, or a selective electron beam melting method, for instance. Yet, it is also conceivable that the method is a binder jetting method, particularly a metal binder jetting method, for instance. All annotations concerning the method for determining an amount of build material which is to be applied in a build plane also apply to the method for additively manufacturing at least one three-dimensional object.

Moreover, the invention also relates to a build material dosing device for an apparatus for additively manufacturing at least one three-dimensional object by means of successive layerwise selective irradiation and consolidation of layers of build material, e.g. a ceramic, metal, or polymer build material, applied in the build plane of the apparatus by means of at least one energy beam, e.g. an electron or laser beam, the build material dosing device comprising a control unit. The build material dosing device is configured to determine an amount of build material which is to be applied in the build plane of the apparatus for generating a respective layer of build material which is to be selectively irradiated and consolidated on basis of a method as specified herein. All annotations concerning the method for determining an amount of build material which is to be applied in a build plane also apply to the build material dosing device.

The build material dosing device may further comprise or be connected with at least one build material supplying device, e.g. a build material reservoir, from which build material may be supplied and at least one dosing element, e.g. a moveable supported dosing table, co-acting with the build material supplying device so as to dose a determined amount of build material which is to be applied in the build plane.

Finally, the invention relates to an apparatus for additively manufacturing at least one three-dimensional object by means of successive layerwise selective irradiation and consolidation of layers of build material, e.g. a ceramic, metal, or polymer build material, applied in the build plane of the apparatus by means of at least one energy beam, e.g. an electron beam or a laser beam. The apparatus can be a selective laser sintering apparatus, a selective laser melting apparatus, or a selective electron beam melting apparatus, for instance. Yet, it is also conceivable that the apparatus is a binder jetting apparatus, particularly a metal binder jetting apparatus, for instance.

The apparatus comprises a number of functional and/or structural devices which are operable or operated during its operation. Each functional and/or structural device may comprise a number of functional and/or structural units. Exemplary functional and/or structural devices are the build material dosing device as specified above, a build material application device which is configured to apply an amount of dosed build material which is to be selectively irradiated and consolidated in the build plane of the apparatus, and an irradiation device which is configured to selectively irradiate and thereby, consolidate portions of a layer of build material with at least one energy beam. Since the apparatus comprises a respective build material dosing device, all annotations concerning the method for determining an amount of build material which is to be applied in a build plane also apply to the apparatus.

Exemplary embodiments of the invention are described with reference to the Fig., whereby.

Figure 1:
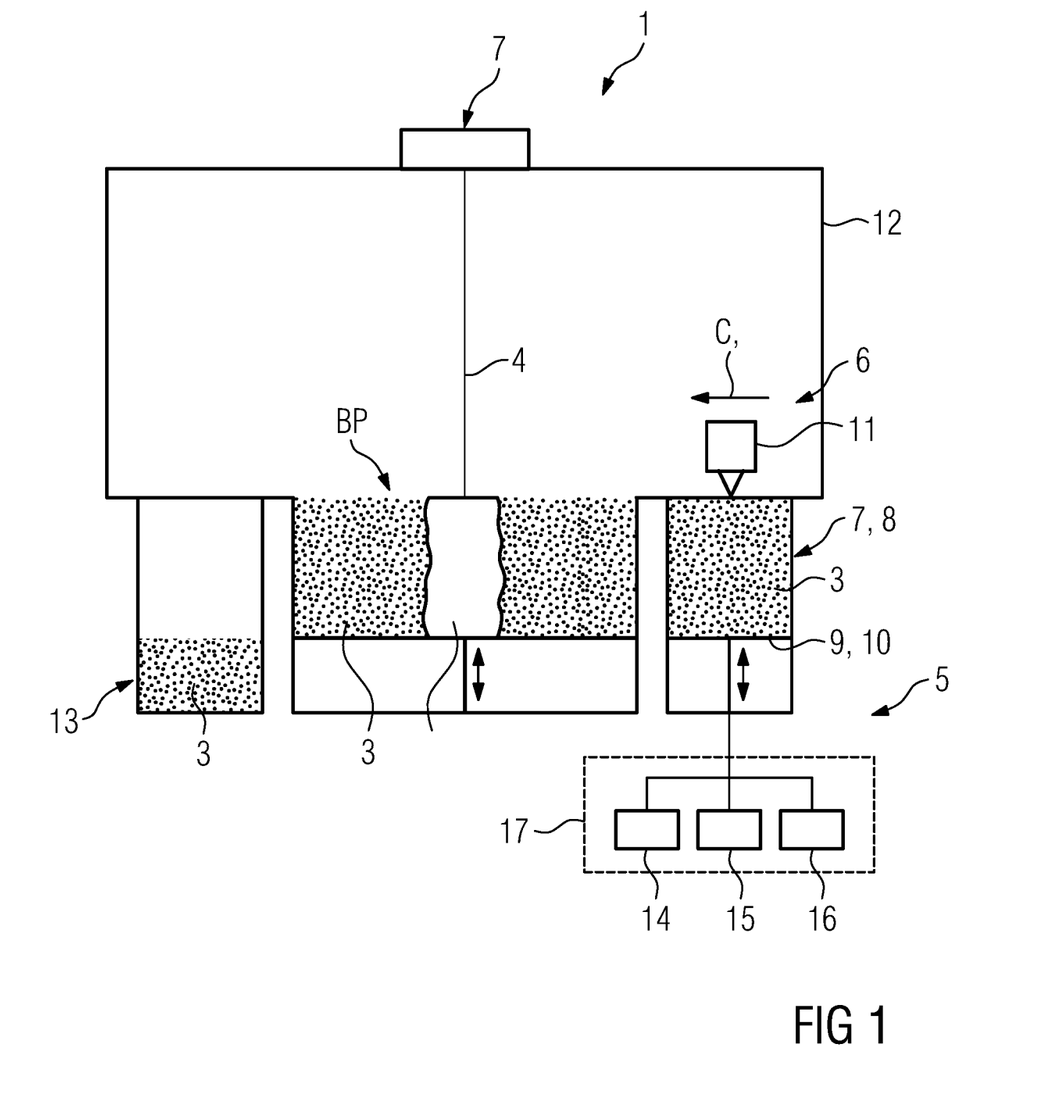
FIG. 1 shows a principle drawing of an apparatus for additively manufacturing of three-dimensional objects according to an exemplary embodiment.

FIG. 1 shows a principle drawing of an exemplary embodiment of an apparatus 1 for additively manufacturing three-dimensional objects 2, e.g. technical components, by means of successive layerwise selective irradiation and accompanying consolidation of layers of a powdered build material 3, e.g. a metal powder, which can be consolidated by means of at least one energy beam 4 according to an exemplary embodiment. The energy beam 4 may be an electron beam or a laser beam, for instance. The apparatus 1 may thus, be embodied as a selective electron beam melting apparatus or as a selective laser melting apparatus, for instance.

The apparatus 1 comprises a number of functional and/or structural devices which are operable and operated during its operation. Each functional and/or structural device may comprise a number of functional and/or structural units. Operation of the functional and/or structural devices and the apparatus 1, respective is controlled by a (central) control device (not depicted).

Exemplary functional and/or structural devices of the apparatus 1 are a build material dosing device 5, a build material application device 6, and an irradiation device 7.

The build material dosing device 5—which may be embodied as a module—is configured to determine an amount of build material 3 which is to be applied in the build plane BP of the apparatus 1 for generating a respective layer of build material 3 which is to be selectively irradiated and consolidated during additively manufacturing a three-dimensional object 2 by means of the apparatus 1. The build material dosing device 5 comprises a build material supplying device 7, e.g. a build material reservoir 8, from which build material 3 may be supplied and at least one dosing element 9, e.g. a (vertically) moveable supported dosing table 10, co-acting with the build material supplying device 7 so as to dose a determined amount of build material 3 which is to be applied in the build plane BP of the apparatus 1.

The build material application device 6 is configured to apply an amount of build material 3 which was dosed by means of the build material dosing device 5 in the build plane BP of the apparatus 1 so as to generate respective layers of build material 3 which are to be selectively irradiated and consolidated during additively manufacturing a three-dimensional object 2 by means of the apparatus 1. The build material application device 6 comprises at least one build material application element 11. The build material application element 11 is moveably supported within the process chamber 12 of the apparatus 1. The build material application device 11 may thus be moved across the build plane BP of the apparatus 1 so as to apply an amount of dosed build material 3 in the build plane BP of the apparatus 1 and generate a respective layer of build material 3 which is to be selectively irradiated and consolidated during additively manufacturing a three-dimensional object 2 by means of the apparatus 1. An exemplary motion of the build material application element 11 is indicated by arrow CD. The arrow CD represents an exemplary coating direction of the build material application element 11.

The irradiation device 7 is configured to selectively irradiate and thereby, consolidate respective layers of build material 3 which have been applied in the build plane BP of the apparatus 1 by means of the build material application device 6 with at least one energy beam 4. The irradiation device 6 may comprise a beam generating unit (not shown) configured to generate at least one energy beam 4 and a beam deflecting unit (not shown), e.g. a scanning unit, configured to deflect an energy beam 4 to diverse positions within the build plane E of the apparatus 1.

FIG. 1 also shows an exemplary build material receiving device 13. The build material receiving device 13—which may be embodied as a module—is configured to receive build material 3 which was not applied in the build plane BP of the apparatus 1.

The configuration of the apparatus 1 of FIG. 1 allows for implementing a method for determining an amount of build material 3 which is to be applied in the build plane BP of the apparatus 1. The method thus, serves for determining an amount of build material 3 which is to be applied in the build plane BP of the apparatus 1 so as to generate respective layers of build material 3 which are to be selectively irradiated and consolidated during an additive manufacturing process. The method may be implemented in context with a (superordinate) method for applying an amount of build material 3 in the build plane BP of the apparatus 1 and in a (further superordinate) method for additively manufacturing three-dimensional objects 2 by means of the apparatus 1.

The method for determining an amount of build material 3 which is to be applied in the build plane BP of the apparatus 1 comprises the following basic steps (see also FIG. 2, 3 each showing a top-view of the build plane BP of the apparatus 1 of FIG. 1 according to an exemplary embodiment, whereby the contours of the object 2 in the respective layer are indicated by lines L1, L2, L3, and L4):

According to a first step, the complete build plane BP of the apparatus 1 is subdivided into a plurality of build plane elements BPE. In other words, the build plane BP of the apparatus 1 on which the method is implemented, is subdivided into a plurality of sub-areas. Thereby, each sub-area of the build plane BP is represented by a respective build plane element BPE.

Figure 2:
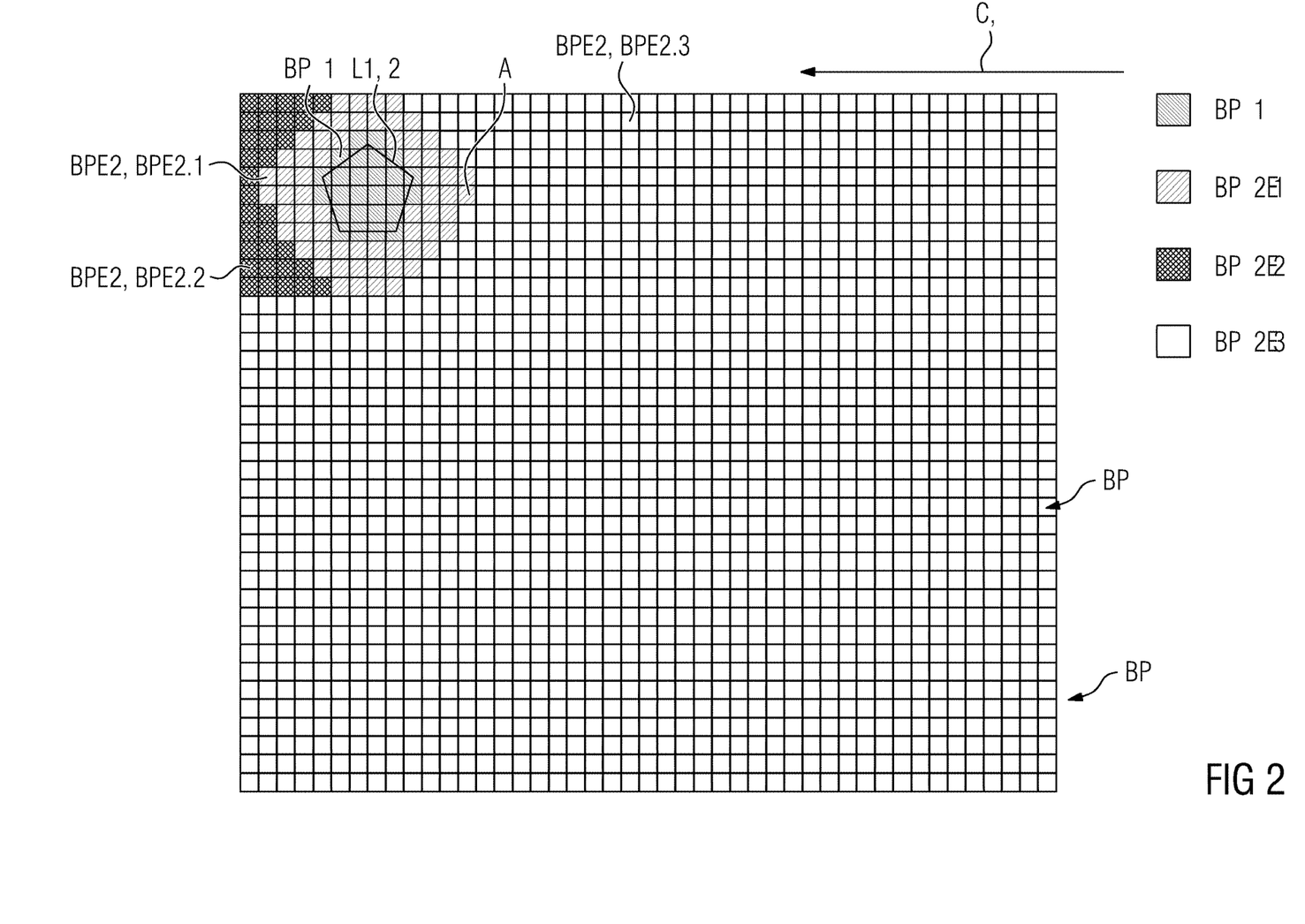
FIG. 2, 3 each show a top-view of the build plane of the apparatus of FIG. 1 according to an exemplary embodiment.
Figure 3:
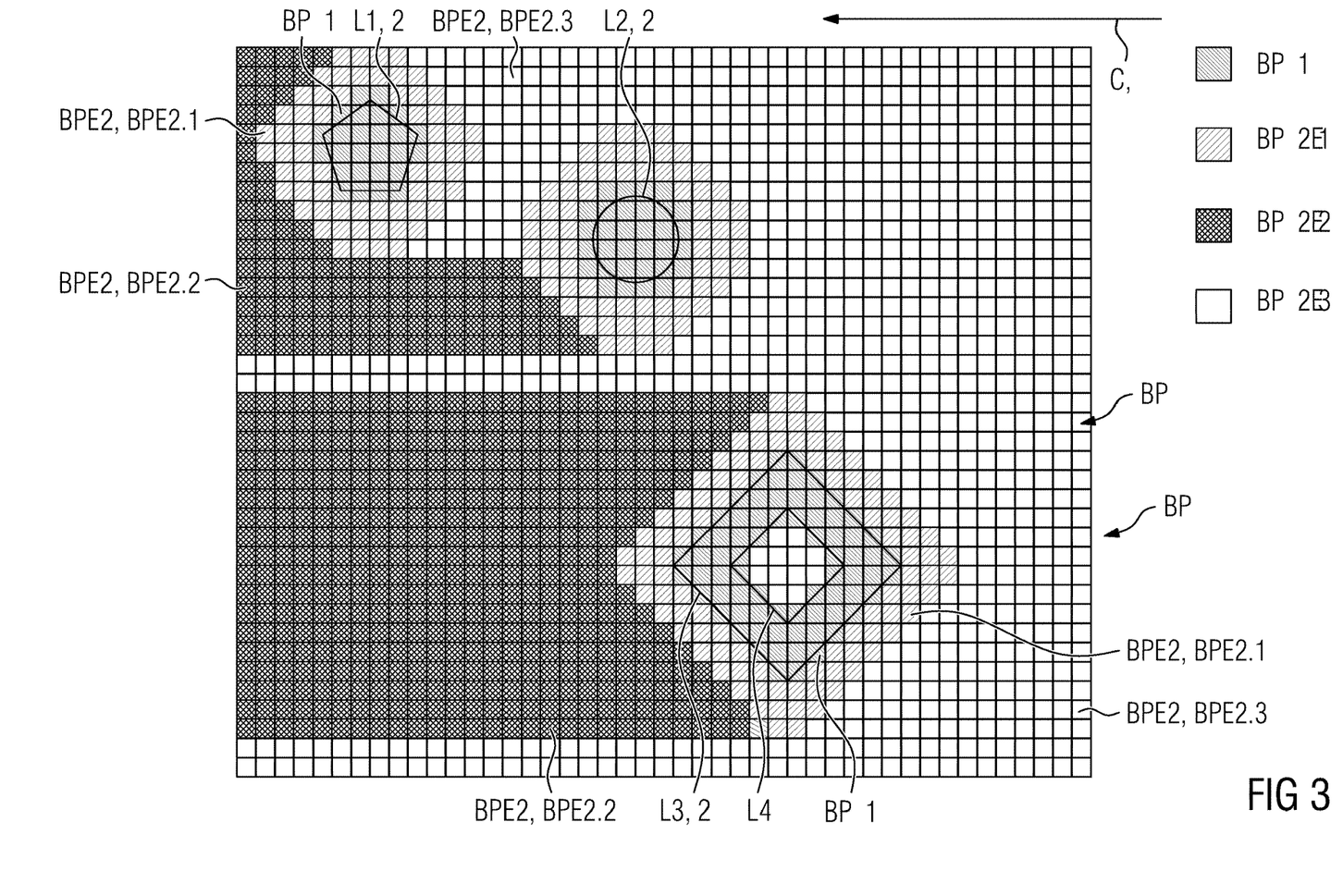

As mentioned above, FIG. 2, 3 each show each showing a top-view of the build plane BP of the apparatus 1 of FIG. 1 according to an exemplary embodiment. Thereby, FIG. 2 shows that the method is applicable for a layer in which only one area is to be selectively irradiated and consolidated, and FIG. 3 shows that the method is applicable for a layer in which a plurality of areas are to be selectively irradiated and consolidated.

As is apparent from FIG. 2, 3, the build plane elements BPE may be arranged in a regular pattern, particularly in a two-dimensional matrix of columns and lines. The number of columns may be equal to the number of lines. The number of build plane elements BPE in a respective column may be equal to the number of build plane elements BPE in a respective line.

According to the exemplary embodiments of FIG. 2, 3, the build plane BP is subdivided into a plurality of rectangular, particularly square, build plane elements BPE of the same size with the build plane elements BPE being disposed in a regular matrix of a given number or columns and a given number of lines resulting in a chessboard-like pattern.

The subdividing step is performed for at least one layer which is to be selectively irradiated and consolidated during additively manufacturing at least one three-dimensional object 2 by means of the apparatus 1. Typically, the subdividing step is successively performed for all layers, which are to be selectively irradiated and consolidated during additively manufacturing at least one three-dimensional object 2 by means of the apparatus 1.

The subdividing step may be executed by a hard- and/or software embodied subdividing unit 14 (see FIG. 1) which is configured to subdivide the build plane BP into a plurality of build plane elements BPE. The subdividing unit 14 may comprise at least one subdividing algorithm or rule, respectively. A respective subdividing algorithm or rule, respectively may particularly comprise pre-definable or pre-defined subdividing parameters, such as the subdividing area, i.e. the area of the build plane BP which is to be subdivided into respective build plane elements BPE, the subdividing pattern, i.e. the (two-dimensional) pattern in which the build plane BP is subdivided, the geometry of the build plane elements BPE, the size of the build plane elements BPE, etc. The subdividing step may be performed on basis of user-inputs allowing a user to pre-define subdividing parameters and/or adjust pre-defined subdividing parameters. User-inputs may be given by an appropriate mobile or immobile user-interface (not shown), e.g. a touch-panel or the like.

According to a second step, the build plane elements BPE are categorized in a first category BPE1 and/or in at least one second category BPE2. As will be apparent from below, the second category BPE2 has different sub-categories BPE2.1, BPE2.2, and BPE2.3.

As is discernible form FIG. 2, 3, the first category BPE1 indicates that a respective build plane element BPE is located in an area of the build plane BP, which is to be selectively irradiated and consolidated during the selective irradiation and consolidation of the respective layer. The second category BPE2 generally, indicates that a respective build plane element BPE is not located in an area of the build plane BP, which is to be selectively irradiated and consolidated during the selective irradiation and consolidation of the respective layer. Hence, it is determined for each build plane element BPE, if it is located in an area of the build plane BP, which is to be selectively irradiated and consolidated during the selective irradiation and consolidation of the respective layer, or, if it is not located in an area of the build plane BP, which is to be selectively irradiated and consolidated during the selective irradiation and consolidation of the respective layer. If it is determined that a build plane element BPE is located in an area of the build plane BP, which is to be selectively irradiated and consolidated during the selective irradiation and consolidation of the respective layer, then the respective build plane element BPE is categorized as a build plane element BPE of the first category BPE1. If it is determined that a build plane element BPE is not located in an area of the build plane BP, which is to be selectively irradiated and consolidated during the selective irradiation and consolidation of the respective layer, then the respective build plane element BPE is categorized as a build plane element BPE of the second category BPE2 or a respective sub-category BPE2.1-BPE2.3 of the second category BPE2. The categorizing of the build plane elements BPE may be performed in column- or line-wise manner, for example.

The categorizing step may be performed on basis of build data, e.g. slice data, related to the three-dimensional object(s) 2 which is/are to be additively manufactured. Respective build data typically, comprises information on the number of layers for additively manufacturing the three-dimensional object(s) 2 which is/are to be additively manufactured. Respective build data typically, also comprises information on the locations, which are to be selectively irradiated and consolidated in each layer for additively manufacturing the three-dimensional object(s) 2 which is/are to be additively manufactured. Respective build data may also comprise information on the locations, which are not to be selectively irradiated and consolidated in each layer for additively manufacturing the three-dimensional object(s) 2 which is/are to be additively manufactured.

The categorizing step may be performed by a hard- and/or software embodied categorizing unit 15 (see FIG. 1) which is configured to categorize the build plane elements BPE in a first category BPE1, which indicates that a respective build plane element BPE is located in an area of the build plane BP, which is to be selectively irradiated and consolidated during the selective irradiation and consolidation of the respective layer, or a second category BPE2 or a respective sub-category BPE2.1-BPE2.3 of the second category BPE2, which indicates that a respective build plane element BPE is not located in an area of the build plane BP, which is to be selectively irradiated and consolidated during the selective irradiation and consolidation of the respective layer.

According to a third step, the amount of build material 3 which is to be applied in a respective layer is determined on basis of the number of build plane elements BPE which have been categorized in the first category BPE1 and/or the number of build plane elements BPE2 which have been categorized in the second category BPE2 or a respective sub-category BPE2.1-BPE2.3 of the second category BPE2. Hence, the determination of the amount of build material 3 which is to be applied in the build plane BP so as to generate a respective layer which is to be selectively irradiated and consolidated is performed on basis of a respective categorization of build plane elements BPE in respective categories. In other words, the amount of build material 3 which is to be applied in the build plane BP is individually determined for each layer which is to be selectively irradiated and consolidated during additively manufacturing the three-dimensional object(s) 2. Thereby, the locations or regions of the respective layer which are to be selectively irradiated and consolidated and the locations or regions of the respective layer which are not to be selectively irradiated and consolidated are considered for determining the amount of build material 3 which is to be applied in the respective layer. Hence, by categorizing respective build plane elements BPE in the aforementioned categories BPE1, BPE2 and sub-categories BPE2.1-BPE2.3, respectively, and determining the amount of build material 3 which is to be applied in the respective layer on basis of the categorization of the build plane elements BPE in the respective categories BPE1, BPE2 and sub-categories BPE2.1-BPE2.3, respectively, an individual determination of an amount of build material 3 which is to be applied in the respective layer is possible for each layer. The individual determination of the amount of build material 3 which is to be applied in the respective layer takes into account the area of the respective layer, which is to be selectively irradiated and consolidated, and the area of the respective layer, which is not to be selectively irradiated and consolidated.

The determination step may be performed by a hard- and/or software embodied determining unit 16 which is configured to determine the amount of build material 3 which is to be applied in the respective layer on basis of the number of build plane elements BPE which have been categorized in the first category BPE2 and/or the number of build plane elements BPE which have been categorized in the at second category BPE2 and sub-categories BPE2.1-BPE2.3, respectively.

As indicated in FIG. 1, the subdividing unit 14, the categorizing unit 15, and the determining unit 16 may be separate hard- and/or software embodied units or combined in one hard- and/or software embodied control unit 17. Respective units 14-16 or a respective control unit 17 may form part of the build material dosing device 5 which is assignable or assigned to apparatus 1.

All steps of the method may be performed (fully) automatically.

As mentioned above, the method may comprise subdividing the build plane elements BPE of the second category BPE2 at least in a first sub-category BPE2.1 and a second sub-category BPE2.2. Hence, build plane elements BPE of the second category BPE2 may be further sub-categorized on basis of their spatial arrangement or relationship relative to the build plane elements BPE of the first category BPE1.

As is discernible from FIG. 2, 3, the first sub-category BPE2.1 indicates that a respective build plane element BPE is located directly adjacent to at least one build plane element BPE of the first category BPE1 and/or that a respective build plane element BPE is located inside a specific threshold area A of a given number of build plane elements BPE directly adjacent to at least one build plane element BPE of the first category BPE1. Build plane elements BPE of the first sub-category BPE2.1 thus, represent build plane elements BPE which are (i) not to be selectively irradiated and consolidated, and are located (ii) directly adjacent to at least one build plane element BPE of the first category BPE1 and/or (iii) inside a specific threshold area A of a given number of build plane elements BPE directly adjacent to at least one build plane element BPE of the first category BPE1. In other words, build plane elements BPE of the first sub-category BPE2.1 are (directly) adjacently located to build plane elements BPE of the first category BPE1. The given number of build plane elements BPE directly adjacent to at least one build plane element BPE of the first category BPE1 may be pre-definable or pre-defined; hence, the number of build plane elements BPE1 directly adjacent to at least one build plane element BPE of the first category BPE1 may be defined on basis of user-inputs allowing a user to pre-define the number of build plane elements BPE directly adjacent to at least one build plane element BPE of the first category BPE1 and/or adjust a pre-defined number of build plane elements BPE directly adjacent to at least one build plane element BPE of the first category BPE1.

As is discernible from FIG. 2, 3 respective build plane elements BPE of the first sub-category BPE2.1 are typically, located in an area behind respective build plane elements BPE of the first category BPE1 for a given direction (see arrow(s) CD indicating the re-coating direction) of applying build material 3 in the respective layer.

As is discernible from FIG. 2, 3, the first sub-category BPE2.1 serves for generating a safety zone (directly) surrounding at least part of the build plane elements BPE of the first category BPE1 which are to be selectively irradiated and consolidated in the respective layer. The safety zone ensures that in any case a sufficient amount of build material 3 is applied in the respective layer.

The second sub-category BPE2.2 indicates that, for a given direction (see arrow CD indicating the re-coating direction) of applying build material 3 in the respective layer, a respective build plane element BPE is located in an area behind and outside a specific threshold area A of a given number of build plane elements BPE directly adjacent to at least one build plane element BPE of the first category BPE1. Build plane elements BPE of the second sub-category BPE2.2 thus, represent build plane elements BPE which are (i) not to be selectively irradiated and consolidated, and are located (ii) (directly) adjacent to at least one build plane element BPE of the first sub-category BPE2.2 and thus, (iii) outside a respective specific threshold area A of a given number of build plane elements BPE of the first sub-category BPE2.1. In other words, build plane elements BPE of the second sub-category BPE2.2 are (directly) adjacently disposed to build plane elements of the first sub-category BPE2.1.

As is discernible from FIG. 2, 3 there may also be a third sub-category BPE2.3. The third sub-category BPE2.3 indicates that, for a given direction (see arrow CD indicating the re-coating direction) of applying build material 3 in the respective layer, a respective build plane element BPE is located in an area in front of at least one build plane element BPE of the first category BPE1.

As is apparent from the above, the direction (see arrow CD indicating the re-coating direction) of applying build material 3 in the respective layer, e.g. a coating direction, is moved across the build plane BP so as to generate a layer which is to be selectively irradiated and consolidated, may also be considered for categorizing build plane elements BPE and thus, for determining the amount of build material 3 which is to be applied in the respective layer. The direction of applying build material 3 in the respective layer particularly, serves for distinguishing between build plane elements BPE which are located in an area behind at least one build plane element BPE of the first category BPE1, from build plane elements BPE which are located in an area in front of at least one build plane element BPE of the first category BPE1 for a given direction of applying build material 3 in the respective layer.

According to the method, a specific amount of build material 3 may be assigned to each category BPE1, BPE2 or sub-category BPE2.1-BPE2.3, respectively. Hence, the determined total amount of build material 3 which is to be applied in a respective layer, may be determined on basis of the specific amounts of build material 3 which are assigned to each category BPE1, BPE2 and sub-category BPE2.1-BPE2.3 in the respective layer. The determined total amount of build material 3 which is to be applied in a respective layer will typically, be high(er) when a plurality of build plane elements BPE of a category is given to which a high(er) amount of build material is assigned than when a plurality of build plane elements BPE of a category is given to which a low(er) amount of build material is assigned.

The amount of build material 3 which is assigned to build plane elements BPE of the first category BPE1 is typically, larger than the amount of build material 3 which is assigned to build plane elements BPE of the second category BPE2 or respective sub-categories BPE2.1-BPE2.3 of the second category BPE2. As such, a first amount of build material 3 is assigned to build plane elements BPE of the first category BPE1, a second amount of build material 3 which is lower than the first amount of build material 3 is assigned to build plane elements BPE of the second category BPE2. When regarding the sub-categories BPE2.1-BPE2.3 of the second category BPE2, the amount of build material 3 assigned to build plane elements BPE of the first sub-category BPE2.1, is typically larger than the amount of build material 3 assigned to build plane elements BPE of the second sub-category BPE2.2, and the amount of build material 3 assigned to build plane elements BPE of the second sub-category BPE2.2, is typically larger than the amount of build material 3 assigned to build plane elements BPE of the third sub-category BPE2.3. It is also possible that the amount of build material assigned to build plane elements BPE of the second sub-category BPE2.2 and/or the third sub-category BPE2.3 is zero.

The amount of build material 3 assigned to each category BPE1, BPE2 or sub-category BPE2.1-BPE2.3 may be related with a specific dose factor of the build material dosing device 5. Thus, each category BPE1, BPE2 or sub-category BPE2.1-BPE2.3 may be related with a specific dose factor of the build material dosing device 5. Hence, the amount of build material 3 which is to be dosed for being applied in a respective layer will be high(er) when a plurality of build plane elements BPE of a category to which a high(er) dose factor is assigned is given than when a plurality of build plane elements BPE of a category to which a low(er) dose factor is assigned is given.

The dose factor which is assigned to the build plane elements BPE of the first category BPE1 is typically larger than the dose factor which is assigned to the build plane elements BPE of the second category BPE2 or respective sub-categories BPE2.1-BPE2.3 of the second category BPE2. As such, a first dose factor is assigned to the build plane elements BPE of the first category, at least one second dose factor which is lower than the first dose factor is assigned to the build plane elements BPE of the second category BPE or respective sub-categories BPE2.1-BPE2.3 of the second category BPE2. When regarding the sub-categories of the second category, the dose factor assigned to build plane elements which have been categorized in the first sub-category, is typically larger than the dose factor assigned to build plane elements which have been categorized in the second (or third) sub-category.

When regarding the sub-categories BPE2.1-BPE2.3 of the second category BPE2, the dose factor assigned to build plane elements BPE of the first sub-category BPE2.1, is typically larger than the dose factor assigned to build plane elements BPE of the second sub-category BPE2.2, and the dose factor assigned to build plane elements BPE of the second sub-category BPE2.2, is typically larger than the dose factor assigned to build plane elements BPE of the third sub-category BPE2.3. It is also possible that the dose factor assigned to build plane elements BPE of the second sub-category BPE2.2 and/or the third sub-category BPE2.3 is zero or negative.

The amount of build material 3 which is to be applied in the build plane BP may finally, be determined on basis of summing up all build plane elements BPE of the first category BPE1 and being located in a specific area of the build plane BP, particularly in a (straight) line extending across the build plane BP, particularly in direction of applying build material 3 in the respective layer (see arrow CD indicating the re-coating direction), and summing up all build plane elements BPE of the second category BPE2 and respective sub-categories BPE2.1-BPE2.3 of the second category BPE2 and being located in the specific area of the build plane BP, particularly in the (straight) line extending across the build plane BPE, particularly in the direction of applying build material 3 in the respective layer. Hence, the respective dose factors assigned to the respective categories BPE1, BPE2 or sub-categories BPE2.1-BPE2.3 may be summed up so as to build a resulting dose factor.

Thereby, the amount of build material 3 which is to be applied in the build plane BP may be determined as the one of the area of the build plane BP, particularly in a respective (straight) line extending across the build plane BP, particularly in the direction of applying build material 3 in the respective layer, having the highest amount of build material 3 assigned thereto. Likewise, the resulting dose factor which is to be applied for generating the respective layer of build material 3 which is to be selectively irradiated and consolidated may be determined as the one of the area of the build plane BP, particularly in the respective (straight) line extending across the build plane BP, particularly in the direction of applying build material 3 in the respective layer, having the highest sum of dose factors. The resulting dose factor may thus, be or correspond at least to the dose factor of the respective area of the build plane BP having the highest sum of dose factors.

In the exemplary embodiments according to the Fig. in which the build plane BP is divided in a two-dimensional matrix of columns and lines, i.e. in which the build plane elements BPE are arranged in a regular pattern of a two-dimensional matrix of columns and lines, the dose factors may be determined for each column or line, respectively. The dose factors of the respective build plane elements BPE in the respective column or line are summed-up; in other words, the dose factors of the build plane elements BPE1 of the respective column or line and being categorized in the first category, and the dose factors of the build plane elements BPE2.1-BPE2.3 of the respective column or line and being categorized in the second category or respective sub-categories of the second category, are summed-up. As an example, summing-up respective dose factors for a specific column or line may be performed as follows:

Sum of dose factors(for a respective column or line)=dose factor of build plane elements BPE1 of first category×number of build plane elements BPE1 of first category in the respective column or line+dose factor of build plane elements of first sub-category BPE2.1 of second category×number of build plane elements BPE2.1 of first sub-category of second category in the respective column or line+dose factor of build plane elements of second sub-category BPE2.2 of second category×number of build plane elements of second sub-category BPE2.2 of second category in the respective column or line+dose factor of build plane elements of third sub-category BPE2.3 of second category×number of build plane elements of third sub-category of second category BPE2.3 in the respective column or line.

The above summing-up of dose factors may be performed for each column or line, respectively so that the number of determined sums may correspond to the number columns or lines, respectively.

The resulting dose factor may be determined as the one of the respective column or line having the highest sum of dose of factors. The amount of build material 3 which is to be applied in the build plane BP of the apparatus 1 for generating the respective layer of build material 3 which is to be selectively irradiated and consolidated may thus, be determined as the one of the column or line having the highest sum of dose factors.

The determined amount of build material 3 which is finally, to be applied in the build plane BP may be added to a pre-definable or pre-defined reference amount of build material 3 which is to be applied in the build plane BP. Thus, by adding up the determined amount of build material 3 to a respective reference amount of build material 3, it may be ensured that in any case a sufficient amount of build material 3 is applied in the respective layer. The reference amount of build material 3 is typically, also assigned to a pre-definable or pre-defined reference dose factor. Accordingly, the resulting dose factor which is to be applied for generating the respective layer of build material 3 which is finally, to be applied in the build plane BP may be added to a pre-definable or pre-defined reference dose factor so as to achieve a final dose factor.

The method may be implemented in context with a (superordinate) method for applying an amount of build material 3 in a build plane BP of a respective apparatus 1 and in a (further superordinate) method for additively manufacturing three-dimensional objects 2, respectively.

The method for applying an amount of build material 3 in a build plane BP of a respective apparatus 1 comprises the steps of: determining an amount of build material 3 which is to be applied in the build plane BP of the apparatus 1 for generating a respective layer of build material 3 which is to be selectively irradiated and consolidated, and applying the determined amount of build material 3 in the build plane BP of the apparatus for generating the respective layer of build material which is to be selectively irradiated and consolidated. Thereby, determining the respective amount an amount of build material 3 which is to be applied in the build plane BP of the apparatus 1 for generating a respective layer of build material 3 which is to be selectively irradiated and consolidated is performed on basis of the method for determining an amount of build material 3 which is to be applied in a build plane BP as specified above.

The method for additively manufacturing at least one three-dimensional object 2 by means of successive layerwise selective irradiation and consolidation of layers of build material 3 comprises that the layers of build material 3 which are to be selectively irradiated and consolidated are applied on basis of the aforementioned method for applying an amount of build material 3 in a build plane BP of a respective apparatus 1.

The invention claimed is:

1. A method of additively manufacturing a three-dimensional object, the method comprising:
   subdividing at least portion of a build plane into a plurality of build plane elements, the subdividing performed for respective ones of a plurality of layers of a powder build material to be selectively irradiated and thereby consolidated by an energy beam to form a three-dimensional object;
   categorizing a first portion of the plurality of build plane elements into a first category and a second portion of the plurality of build plane elements into a second category, the categorizing performed for respective ones of the plurality of layers of the powder build material, the first category indicating that for the respective layer, the respective build plane element is located in an area of the build plane for which the powder build material is to be selectively irradiated and thereby consolidated by the energy beam, and the second category indicating that for the respective layer, the respective build plane element is located outside of the area of the build plane for which the powder build material is to be selectively irradiated and thereby consolidated by the energy beam;
   determining a first dose factor, wherein determining the first dose factor comprises determining a first sum of build plane elements in the first category arranged in a first row extending across the build plane, and determining a second dose factor, wherein determining the second dose factor comprises determining a second sum of build plane elements in the second category arranged in a second row extending across the build plane;
   determining a specific amount of the powder build material to be applied in the respective layer based at least in part on a first quantity of the plurality build plane elements having been categorized in the first category and/or on a second quantity of the build plane elements having been categorized in the second category; and
   applying the specific amount of the powder build material to the build plane for the respective ones of the plurality of layers of the powder build material, the powder build material being applied to the first portion of the plurality of build plane elements having been categorized into the first category for the respective layer and to the second portion of the plurality of build plane elements having been categorized into the second category for the respective layer.

2. The method of claim 1, comprising:
   subcategorizing the build plane elements of the second category into a first subcategory or a second subcategory, the first subcategory indicating that for the respective layer, the respective build plane element is disposed directly adjacent to at least one build plane element of the first category and/or that the respective build plane element is located inside a specific threshold area, the specific threshold area defined by a given quantity of build plane elements directly adjacent to at least one build plane element of the first category, and the second subcategory indicating that for the respective layer, the respective build plane element is located outside the specific threshold area.

3. The method of claim 1, comprising:
   assigning a first specific amount of the powder build material to the first category, wherein the first specific amount of the powder build material is determined based at least in part on the first quantity of the plurality build plane elements having been categorized in the first category; and
   assigning a second specific amount of the powder build material to the second category, wherein the second specific amount of the powder build material is determined based at least in part on the second quantity of the build plane elements having been categorized in the second category.

4. The method of claim 3, wherein the first specific amount of the powder build material is greater than the second specific amount of the powder build material.

5. The method of claim 3, comprising:
   determining the first specific amount of the powder build material based at least in part on the first dose factor, and determining the second specific amount of the powder build material based at least in part on the second dose factor.

6. The method of claim 5,
   the first row is oriented in a direction of movement of a build material application element used to apply the powder build material; and
   wherein the second row is oriented in the direction of movement of the build material application element used to apply the powder build material.

7. The method of claim 6, comprising:
   subcategorizing the build plane elements of the second category into a first subcategory or a second subcategory, the first subcategory indicating that for the respective layer, the respective build plane element is disposed directly adjacent to at least one build plane element of the first category and/or that the respective build plane element is located inside a specific threshold area, the specific threshold area defined by a given quantity of build plane elements directly adjacent to at least one build plane element of the first category, and the second subcategory indicating that for the respective layer, the respective build plane element is located outside the specific threshold area; and
   determining a first sub-dose factor corresponding to the first subcategory, wherein determining the first sub-dose factor comprises determining a first sum of build plane elements in the first subcategory arranged in a first row extending across the build plane, the first row oriented in the direction of movement of the build material application element used to apply the powder build material; and
   determining a second sub-dose factor corresponding to the second subcategory, wherein determining the second sub-dose factor comprises determining a second sum of build plane elements in the second subcategory arranged in a second row extending across the build plane, the second row oriented in the direction of movement of the build material application element used to apply the powder build material; and
   wherein determining the second dose factor comprises summing the first sub-dose factor and the second sub-dose factor.

8. A method of additively manufacturing a three-dimensional object, the method comprising:
   subdividing at least portion of a build plane into a plurality of build plane elements, the subdividing performed for respective ones of a plurality of layers of a powder build material to be selectively irradiated and thereby consolidated by an energy beam to form a three-dimensional object;

categorizing a first portion of the plurality of build plane elements into a first category and a second portion of the plurality of build plane elements into a second category, the categorizing performed for respective ones of the plurality of layers of the powder build material, the first category indicating that for the respective layer, the respective build plane element is located in an area of the build plane for which the powder build material is to be selectively irradiated and thereby consolidated by the energy beam, and the second category indicating that for the respective layer, the respective build plane element is located outside of the area of the build plane for which the powder build material is to be selectively irradiated and thereby consolidated by the energy beam;

determining, for respective ones of a plurality of rows extending across the build plane, a first quantity of the plurality build plane elements having been categorized in the first category, and a second quantity of the plurality build plane elements having been categorized in the second category;

determining, for the respective ones of the plurality of rows extending across the build plane, an overall dose factor, wherein determining an overall dose factor comprises determining a sum of:
 a first dose factor multiplied by a first sum of build plane elements in the first category; and
 a second dose factor multiplied by a second sum of build plane elements in the second category;

determining the specific amount of the powder build material to be applied in the respective layer based at least in part on the overall dose factor corresponding to a respective one of the plurality of rows extending across the build plane that has a largest value relative to the other respective ones of the plurality of rows extending across the build plane;

determining a specific amount of the powder build material to be applied in the respective layer based at least in part on a first quantity of the plurality build plane elements having been categorized in the first category and/or on a second quantity of the build plane elements having been categorized in the second category; and applying the specific amount of the powder build material to the build plane for the respective ones of the plurality of layers of the powder build material, the powder build material being applied to the first portion of the plurality of build plane elements having been categorized into the first category for the respective layer and to the second portion of the plurality of build plane elements having been categorized into the second category for the respective layer.

9. The method of claim 8, comprising:
subcategorizing the build plane elements of the second category into a first subcategory or a second subcategory, the first subcategory indicating that for the respective layer, the respective build plane element is disposed directly adjacent to at least one build plane element of the first category and/or that the respective build plane element is located inside a specific threshold area, the specific threshold area defined by a given quantity of build plane elements directly adjacent to at least one build plane element of the first category, and the second subcategory indicating that for the respective layer, the respective build plane element is located outside the specific threshold area; and determining, for respective ones of a plurality of rows extending across the build plane, a first sub-quantity of the plurality build plane elements having been categorized in the first subcategory, and a second sub-quantity of the plurality build plane elements having been categorized in the second subcategory;

wherein the second dose factor multiplied by the second sum of build plane elements in the second category comprises a sum of:
 a first sub-dose factor multiplied by a first sum of build plane elements in the first subcategory; and
 a second sub-dose factor multiplied by a second sum of build plane elements in the second subcategory.

10. The method of claim 1, wherein determining the specific amount of the powder build material to be applied in the respective layer comprises:
adjusting a pre-defined amount of the powder build material based at least in part on a first quantity of the plurality build plane elements having been categorized in the first category and/or on a second quantity of the build plane elements having been categorized in the second category.

11. The method of claim 1, wherein the build plane elements are arranged in a regular pattern.

12. The method of claim 11, wherein the regular pattern comprises a matrix of columns and rows.

13. The method of claim 1, wherein the build plane elements have the same geometry and/or area.

14. A non-transitory computer-readable medium comprising computer-executable instructions, which when executed by a processor associated with an additive manufacturing machine, cause the additive manufacturing machine to perform a method of additively manufacturing a three-dimensional object, the method comprising:

subdividing at least portion of a build plane into a plurality of build plane elements, the subdividing performed for respective ones of a plurality of layers of a powder build material to be selectively irradiated and thereby consolidated by an energy beam to form a three-dimensional object;

categorizing a first portion of the plurality of build plane elements into a first category and a second portion of the plurality of build plane elements into a second category, the categorizing performed for respective ones of the plurality of layers of the powder build material, the first category indicating that for the respective layer, the respective build plane element is located in an area of the build plane for which the powder build material is to be selectively irradiated and thereby consolidated by the energy beam, and the second category indicating that for the respective layer, the respective build plane element is located outside of the area of the build plane for which the powder build material is to be selectively irradiated and thereby consolidated by the energy beam;

determining a first dose factor, wherein determining the first dose factor comprises determining a first sum of build plane elements in the first category arranged in a first row extending across the build plane, and determining a second dose factor, wherein determining the second dose factor comprises determining a second sum of build plane elements in the second category arranged in a second row extending across the build plane;

determining a specific amount of the powder build material to be applied in the respective layer based at least in part on a first quantity of the plurality build plane elements having been categorized in the first category and/or on a second quantity of the build plane elements having been categorized in the second category; and applying the specific amount of the powder build material to the build plane for the respective ones of the plurality of layers of the powder build material, the powder build material being applied to the first portion of the plurality of build plane elements having been categorized into the first category for the respective layer and to the second portion of the plurality of build plane elements having been categorized into the second category for the respective layer.

15. A non-transitory computer-readable medium comprising computer-executable instructions, which when executed by a processor associated with an additive manufacturing machine, cause the additive manufacturing machine to perform a method of additively manufacturing a three-dimensional object, the method comprising:

subdividing at least portion of a build plane into a plurality of build plane elements, the subdividing performed for respective ones of a plurality of layers of a powder build material to be selectively irradiated and thereby consolidated by an energy beam to form a three-dimensional object;

categorizing a first portion of the plurality of build plane elements into a first category and a second portion of the plurality of build plane elements into a second category, the categorizing performed for respective ones of the plurality of layers of the powder build material, the first category indicating that for the respective layer, the respective build plane element is located in an area of the build plane for which the powder build material is to be selectively irradiated and thereby consolidated by the energy beam, and the second category indicating that for the respective layer, the respective build plane element is located outside of the area of the build plane for which the powder build material is to be selectively irradiated and thereby consolidated by the energy beam;

determining, for respective ones of a plurality of rows extending across the build plane, a first quantity of the plurality build plane elements having been categorized in the first category, and a second quantity of the plurality build plane elements having been categorized in the second category;

determining, for the respective ones of the plurality of rows extending across the build plane, an overall dose factor, wherein determining an overall dose factor comprises determining a sum of:
a first dose factor multiplied by a first sum of build plane elements in the first category; and
a second dose factor multiplied by a second sum of build plane elements in the second category;

determining the specific amount of the powder build material to be applied in the respective layer based at least in part on the overall dose factor corresponding to a respective one of the plurality of rows extending across the build plane that has a largest value relative to the other respective ones of the plurality of rows extending across the build plane;

determining a specific amount of the powder build material to be applied in the respective layer based at least in part on a first quantity of the plurality build plane elements having been categorized in the first category and/or on a second quantity of the build plane elements having been categorized in the second category; and applying the specific amount of the powder build material to the build plane for the respective ones of the plurality of layers of the powder build material, the powder build material being applied to the first portion of the plurality of build plane elements having been categorized into the first category for the respective layer and to the second portion of the plurality of build plane elements having been categorized into the second category for the respective layer.

16. The non-transitory computer-readable medium of claim 15, wherein the method comprises:

subcategorizing the build plane elements of the second category into a first subcategory or a second subcategory, the first subcategory indicating that for the respective layer, the respective build plane element is disposed directly adjacent to at least one build plane element of the first category and/or that the respective build plane element is located inside a specific threshold area, the specific threshold area defined by a given quantity of build plane elements directly adjacent to at least one build plane element of the first category, and the second subcategory indicating that for the respective layer, the respective build plane element is located outside the specific threshold area; and determining, for respective ones of a plurality of rows extending across the build plane, a first sub-quantity of the plurality build plane elements having been categorized in the first subcategory, and a second sub-quantity of the plurality build plane elements having been categorized in the second subcategory;

wherein the second dose factor multiplied by the second sum of build plane elements in the second category comprises a sum of:
a first sub-dose factor multiplied by a first sum of build plane elements in the first subcategory; and
a second sub-dose factor multiplied by a second sum of build plane elements in the second subcategory.

17. The non-transitory computer-readable medium of claim 14, wherein the method comprises:

assigning a first specific amount of the powder build material to the first category, wherein the first specific amount of the powder build material is determined based at least in part on the first quantity of the plurality build plane elements having been categorized in the first category; and assigning a second specific amount of the powder build material to the second category, wherein the second specific amount of the powder build material is determined based at least in part on the second quantity of the build plane elements having been categorized in the second category.

18. The non-transitory computer-readable medium of claim 17, wherein the first specific amount of the powder build material is greater than the second specific amount of the powder build material.

19. The non-transitory computer-readable medium of claim 17, wherein the method comprises:

determining the first specific amount of the powder build material based at least in part on a first dose factor, and determining the second specific amount of the powder build material based at least in part on a second dose factor.

20. The non-transitory computer-readable medium of claim 19, wherein the
first row is oriented in a direction of movement of a build material application element used to apply the powder build material; and
wherein the second row is oriented in the direction of movement of the build material application element used to apply the powder build material.

\* \* \* \* \*